United States Patent
Singh et al.

(10) Patent No.: US 9,997,815 B2
(45) Date of Patent: Jun. 12, 2018

(54) NON-AQUEOUS MAGNESIUM-AIR BATTERY

(71) Applicant: TOYOTA MOTOR ENGINEERING & MANUFACTURING NORTH AMERICA, INC., Erlanger, KY (US)

(72) Inventors: Nikhilendra Singh, Ypsilanti, MI (US); Timothy S. Arthur, Ann Arbor, MI (US); Fuminori Mizuno, Miyoshi (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 64 days.

(21) Appl. No.: 15/229,801

(22) Filed: Aug. 5, 2016

(65) Prior Publication Data
US 2018/0040934 A1 Feb. 8, 2018

(51) Int. Cl.
| | |
|---|---|
| *H01M 10/054* | (2010.01) |
| *H01M 12/08* | (2006.01) |
| *H01M 10/0568* | (2010.01) |
| *H01M 10/0569* | (2010.01) |

(52) U.S. Cl.
CPC ......... *H01M 12/08* (2013.01); *H01M 10/054* (2013.01); *H01M 10/0568* (2013.01); *H01M 10/0569* (2013.01); *H01M 2220/20* (2013.01)

(58) Field of Classification Search
CPC ............. H01M 12/08; H01M 10/0569; H01M 10/054; H01M 10/0568; H01M 2220/20
See application file for complete search history.

(56) References Cited

U.S. PATENT DOCUMENTS

| | | | |
|---|---|---|---|
| 4,551,220 A * | 11/1985 | Oda ...................... | C25B 11/00 204/294 |
| 5,510,209 A | 4/1996 | Abraham et al. | |
| 7,790,312 B2 | 9/2010 | Costello et al. | |
| 9,225,018 B2 | 12/2015 | Kotani et al. | |
| 9,231,269 B2 | 1/2016 | Nakanishi | |
| 9,240,613 B2 | 1/2016 | Mohtadi et al. | |
| 9,252,456 B2 | 2/2016 | Mohtadi et al. | |
| 2014/0017577 A1 | 1/2014 | Minami et al. | |
| 2014/0045071 A1* | 2/2014 | Sakakibara ......... | H01M 10/054 429/231.6 |
| 2014/0205917 A1 | 7/2014 | Mizuno | |
| 2014/0211370 A1* | 7/2014 | Seymour ................ | H01G 11/36 361/504 |
| 2014/0370399 A1 | 12/2014 | Suzuki | |
| 2015/0037670 A1 | 2/2015 | Tanaka et al. | |
| 2015/0044577 A1 | 2/2015 | Adachi et al. | |

(Continued)

FOREIGN PATENT DOCUMENTS

JP 2010-086924 A 4/2010

*Primary Examiner* — Stewart A Fraser
(74) *Attorney, Agent, or Firm* — Oblon, McClelland, Maier & Neustadt, L.L.P.

(57) ABSTRACT

A magnesium-air battery is described. The battery comprises: an anode compartment; a cathode compartment; and a membrane separating the anode compartment from the cathode compartment. The anode compartment comprises an anode having magnesium, a magnesium alloy or a material capable of insertion and extraction of magnesium, while the cathode compartment comprises an air electrode, a glyme ether or an ionic liquid capable of supporting the reduction of oxygen and a soluble magnesium salt.

12 Claims, 11 Drawing Sheets

(56) References Cited

U.S. PATENT DOCUMENTS

2015/0311565 A1* 10/2015 Muldoon .......... H01M 10/0568
429/335
2016/0028134 A1* 1/2016 Takechi ................ H01M 12/08
429/405

* cited by examiner

NON-AQUEOUS MAGNESIUM-AIR BATTERY

BACKGROUND

The present embodiments are directed to a magnesium-air battery.

Lithium (Li) ion technology has dominated the market as an energy source for small electronic devices and even hybrid and electric vehicles. However, current Li-ion batteries have insufficient energy density to be an energy source for future high energy density storage sources capable of running an electric vehicle.

Metal-air batteries have been under investigation as an advanced generation of high energy density sources which have the theoretical capability to power electronic devices and vehicles for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product combines with the metal cation to form the discharge product as an oxide or peroxide. Upon charge, this process is ideally reversed. Metal-air batteries are recognized to have potential advantageous properties over metal ion batteries because the cathodic material, oxygen, may be obtained from the environmental air atmosphere and the capacity of the battery would in theory be limited by the anodic metal supply. Thus, oxygen gas or a form of ambient air would be supplied continuously from outside the battery and battery capacity and voltage would be dependent upon the oxygen reducing properties and chemical nature of the discharge product formed.

Metal-air batteries based on lithium, sodium and potassium are under investigation. For example, lithium air batteries have the potential to supply 5-10 times greater energy density than conventional lithium ion batteries and have attracted much interest and development attention as a post lithium ion battery technology. A nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology and specifically current nonaqueous lithium air batteries suffer from many technical problems which have hindered achievement of the theoretical capacity.

Battery systems based on multivalent metals such as the alkaline earth metals theoretically have energy densities comparable to lithium, sodium or potassium. Of the alkaline earth metals, magnesium is of great interest because of its low cost, better handling properties and lower toxicity. Importantly, magnesium as an anode material is not known to form metal dendrites such as those known to form with lithium anodes. Aqueous primary batteries based on magnesium have been demonstrated, but the presence of the aqueous system limits the achievable cell potential and moreover, corrosion of the magnesium by water would have to be prevented in order to possibly prepare a rechargeable aqueous magnesium-air battery.

Non-aqueous magnesium-air battery systems would avoid the aqueous corrosion problem and offer the potential to provide a secondary (rechargeable) magnesium-air battery.

Thus, there is a need to provide nonaqueous magnesium-air battery systems and especially a magnesium-air battery system that is rechargeable. Such batteries may be useful as efficient, safe, cost effective, high energy density systems especially for powering vehicles to distances at least equal to or competitive with current hydrocarbon fuel systems.

SUMMARY OF THE EMBODIMENTS

This and other objects are addressed by the disclosure of this application, a first embodiment of which includes a magnesium-air battery, comprising:

an anode compartment comprising an anode comprising magnesium, a magnesium alloy or a material capable of insertion and extraction of magnesium;

a cathode compartment comprising an air cathode, a source of $O_2$, a magnesium salt and a nonaqueous liquid; and a membrane or separator between the anode and cathode compartments.

In an aspect of the first embodiment, the nonaqueous liquid may be at least one of an ether of low volatility and an ionic liquid.

In a particular aspect the ether of low volatility may be selected from the group consisting of dimethoxy ethane (monoglyme), diethylene glycol dimethyl ether (diglyme), triethylene glycol dimethyl ether (triglytne) or tetraethylene glycol dimethyl ether (tetraglyme).

In another particular aspect the ionic liquid may be selected from the group consisting of N-methyl-N-propylpipericlinium bis(trifluoromethansulfonyl)imide (PP13TFSI), N,N-diethyl-N-methyl-N-(2-methoxyethyl) ammonium bis(trifluoromethylsulfonyl)imide (DEME-TFSA).

In a further aspect of the first embodiment, the electrolyte may comprise a magnesium salt of at least one anion selected from the group consisting of bis(trifluoromethansulfonyl)imide anion, bis(fluorosulfonyl)imide anion, tetrafluoroborate anion hexafluorophosphate anion, borohydride anion, an anion of a boron cluster and an anion of a carborane.

In a particular aspect the electrolyte comprises a magnesium salt of an anionic carborane which is selected from the group consisting of $Mg(C_2B_{10}H_{11})X$, $Mg(CB_{11}H_{12})X$, $Mg(CB_{11}H_{12})_2$, $Mg(C_2B_{10}H_{11})_2$, $Mg(C_2B_{10}H_{11})(BH_4)$ and $Mg(CB_{11}H_{12})(BH_4)$ wherein X is $Cl^-$ or $Br^-$.

In a further aspect of the first embodiment, the source of $O_2$ to the battery is ambient air.

In another embodiment, a vehicle containing the magnesium-air battery of any of the aspects of the first embodiment is provided.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out. The phrases "selected from the group consisting of," "chosen from," and the like include mixtures of the specified materials. Terms such as "contain(s)" and the like are open terms meaning 'including at least' unless otherwise specifically noted.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain descriptions air or pure $O_2$ may be described as the source of the cathode ingredient and the meaning of the statement will be clearly understood from the gist of the disclosure.

Further, in the following description the compartments of the electrochemical cell formed by the ion permeable membrane, also referred to as the solid state ion conductor may be described as "rooms," i.e., cathode room for cathode compartment or anode room for anode compartment.

The terms electrochemical cell and battery may in some instances be employed interchangeably. However, it may also be possible to construct a battery with a plurality of electrochemical cells. The meaning of these terms will be understood within the context of the description which follows.

According to the present invention the term "vehicle" means any power driven device designed for transportation including an automobile, truck van, bus, golf cart and other utility forms of transportation.

The present inventors are conducting a broad and detailed study of post-lithium ion battery technologies seeking to identify and develop new and improved energy supply systems having capacity and voltage suited to specific uses. Metal-oxygen batteries having high capacity and high working potential are targets of such study and in this ongoing study the inventors disclose a new and novel magnesium-air battery which provides the potential to overcome many of the problems associated with conventionally known lithium air batteries.

Therefore, according to an embodiment a magnesium-air battery is provided which comprises an anode compartment comprising an anode comprising magnesium, a magnesium alloy or a material capable of insertion and extraction of magnesium; a cathode compartment comprising an air cathode, a source of $O_2$, a magnesium salt and a nonaqueous liquid; and a membrane separating the anode and cathode compartments.

Figure 1:
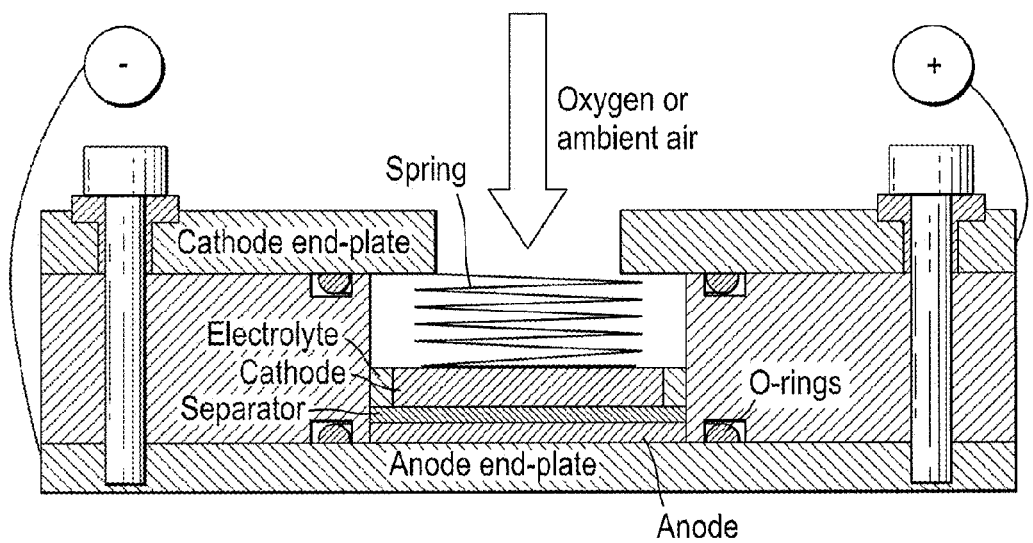
FIG. 1 shows a schematic diagram of a magnesium air battery according to one embodiment of the present invention.

A schematic diagram of the structure and function of the elements of the embodiment is shown in FIG. 1. Spacers may be placed between the air cathode and the separator or membrane to impart and maintain a set distance gap between the cathode and the membrane. The separated cell structure obtained by placement of the membrane, for example, a glass fiber separator, between the cathode compartment and the anode compartment may prevent direct reaction between magnesium ions of the anode compartment and reduced $O_2$ radicals from the cathode compartment. Thus, a working concentration of magnesium ions is maintained near the anode. The membrane or separator may be a solid state conductor which not only separates the cathode and anode to prevent a short circuit, but also protects the moisture sensitive anode from water or carbon dioxide which may enter the battery at the cathode and thus may allow the capability to employ ambient air as the cathode active material.

During discharge of the magnesium air battery magnesium is oxidized at the anode to form magnesium ions in the anode compartment. These ions travel to the separator or membrane, transport across the membrane and enter the cathode compartment. Simultaneously, at the air cathode, oxygen is reduced at the cathode to form anion reduction products including peroxide ions and oxide ions. Although not wishing to be constrained by theory, the inventors believe that discharge of the battery proceeds by a reaction scheme including the following reactions:

$$O_2 + e^- \rightarrow O_2^-$$

(Cathode Reaction)

$$Mg_{0.5}O_2 \rightarrow \tfrac{1}{2}MgO + \tfrac{3}{4}O_2$$

The cathode compartment contains a nonaqueous solvent and a magnesium salt or combination of salts.

The nonaqueous solvent must have a high tolerance of and stability to a radical formed by reduction of $O_2$.

In certain embodiments the nonaqueous solvent may be an ether of low volatility selected from dimethoxy ethane (monoglyme), diethylene glycol dimethyl ether (diglyme), triethylene glycol dimethyl ether (triglyme) or tetraethylene glycol dimethyl ether (tetraglyme).

In another embodiment, the nonaqueous solvent may be an ionic liquid. The ionic liquids suitable may comprise any of cations such as imidazolium cation, piperidinium cation, pyrrolidinium cation and ammonium cation and any of anions such as bis(trifluoromethansulfonyl)imide anion, bis (fluorosulfonyl)imide anion, tetrafluoroborate anion and hexafluorophosphate anion. In selected embodiments the ionic liquid may be N-methyl-N-propylpiperidinium bis (trifluoromethansulfonyl)imide (PP13TFSI) or N,N-diethyl-N-methyl-N-(2-methoxyethyl)ammonium bis(trifluoromethylsulfonyl)imide (DEME-TFSA).

Compatible mixtures of ethers of low volatility and ionic liquids may also be employed where the two liquids are stable to $O_2$ radicals and mutually miscible.

In one useful aspect of the embodiments, the cation portion of the ionic liquid may be tetrabutyammonium (TBA) ion or a magnesium ion. According to this aspect the nonaqueous solvent comprises an ionic liquid and an ether of low volatility wherein the ionic liquid is a magnesium salt of at least one anion selected from the group consisting of bis(trifluoromethansulfonyl)imide anion, bis(fluorosulfonyl)imide anion, tetrafluoroborate anion and hexafluorophosphate anion.

The cathode compartment electrolyte system also includes magnesium salts which are soluble in the nonaqueous solvent. Useful magnesium salts may include magnesium bis(trifluoromethansulfonyl)imide [$Mg(TFSI)_2$], magnesium bis(fluorosulfonyl)imide [$Mg(FSI)_2$], magnesium tetrafluoroborate [$Mg(BF_4)_2$], magnesium hexafluorophosphate [$Mg(PF_6)_2$] and magnesium borohydride [$Mg(BH_4)_2$]. Mixed magnesium salts from this group may also be employed.

In another aspect of the embodiment, electrolytes based on carboranes may be included. Such electrolytes are described in U.S. Pat. No. 9,240,613, issued Jan. 19, 2016, the disclosure of which related to structure and synthesis of the electrolyte salts is incorporated herein by reference and include anions of boron clusters ($B_{12}H_{12}^{-2}$), anionic carborane structures such as $CB_{11}H_{12}^{-1}$ and $C_2B_{10}H_{11}^{-1}$. Examples of electrolyte salts based on these anion structures include $Mg(C_2B_{10}H_{11})X$, $Mg(CB_{11}H_{12})X$, $Mg(CB_{11}H_{12})_2$, $Mg(C_2B_{10}H_{11})_2$, $Mg(C_2B_{10}H_{11})(BH_4)$ and $Mg(CB_{11}H_{12})(BH_4)$ wherein X is a halide ion being especially $Cl^-$ and/or $Br^-$.

Further, a salt that further enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts and piperidinium salts. In one embodiment, an additive salt may be tetrabutyl anunonium (TBA) bis(trifluoromethylsulfonyl) amide (TFSA).

The gap between the membrane or separator and the cathode may be sized according to the performance and end-use requirements for the battery. In theory, a concentration gradient of Mg ions may be formed from the membrane or separator to the cathode. Thus, there may be no gap present between the membrane or separator and the cathode or a gap distance between the cathode and membrane or separator of as little as 0.1 mm may be employed. Such arrangement may then result in a concentration gradient of the cathode discharge product toward the cathode. One of ordinary skill will understand that the greater the gap distance, the greater the opportunity to form a concentration gradient of the discharge products as described. Thus a battery having a gap of 3 mm or more, preferably at least 5 mm may be constructed. Although, in theory, the gap may be as large as 100 mm, size and performance constraints may place a practical upper limit of 20 mm, preferably 15 mm and most preferably 10 mm.

Also, the electrolyte system of the present invention allows for exposure of the cathode to air as an oxygen source because the glyme solvents and ionic liquids are not volatile and therefore electrolyte solvent loss during the battery operation is minimal or not at all.

The membrane may be constructed of a polymer, a ceramic or a composite thereof. To reduce any detrimental effect of gas on performance of the anode, an effective membrane will be fully impermeable or substantially impermeable to gas, thus preventing gas admitted to the cathode compartment from entrance to the anode compartment.

A solid state membrane may also allow a capability of the introduction of ambient air as the oxygen source because it prevents moisture and carbon dioxide from approach to the anode, which would result in deactivation of the anode.

The metal of the anode may comprise any of magnesium, a magnesium alloy or a material capable of intercalation of magnesium, such as, for example bismuth, tin, antimony and indium.

The positive electrode may be of a porous unit construction and may further comprise an oxidation-reduction catalyst, a conductive material and a binder. The cathode may be constructed by mixing the redox catalyst, conductive material and optionally the binder and applying the mixture to a current collector of appropriate shape. The oxidation-reduction catalyst may be any material which promotes the $O_2$ redox reaction.

Examples of an $O_2$ redox catalyst may include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. A precious metal such as Pt, Au, Pd, Ag or any combination thereof may be present in the catalyst. Further, carbon may be included as a redox catalyst. The positive electrode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidlene fluoride (PVDF), styrene butadiene rubber, a tetrafluoroethylene hexafluoro ethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Due to the presence of the membrane or separator the battery is divided into an anode compartment and a cathode compartment. The magnesium mobile ion carrier may be any of the magnesium salts described above.

Herein the system of the anode compartment may be referenced as the anolyte while the system of the cathode compartment may be referenced as the catholyte. Due to the separation of compartments, nonaqueous solvents suitable for the anode compartment may be different from the cathode compartment and may include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethylene glycol dimethyl ether. In some preferred embodiments the solvent may be a nitrile system solvent such as acetonitrile or an ionic liquid.

A schematic drawing of a magnesium-air battery according to one embodiment shown in FIG. 1. In FIG. 1 the electrolyte including the magnesium salt and the nonaqueous solvent, the separator, the anode and the cathode are identified. The cell is housed in a container which is charged with oxygen or ambient air. The gas enters the cathode compartment through the opening of the cathode end plate.

Further, the present invention also includes a vehicle that contains a mamesium-air battery as described herein.

Having generally described the above embodiments, a further understanding can be obtained by reference to certain specific examples which are provided herein for purposes of illustration only and are not intended to be limiting unless otherwise specified.

EXAMPLES

Experiment I

Figure 2:
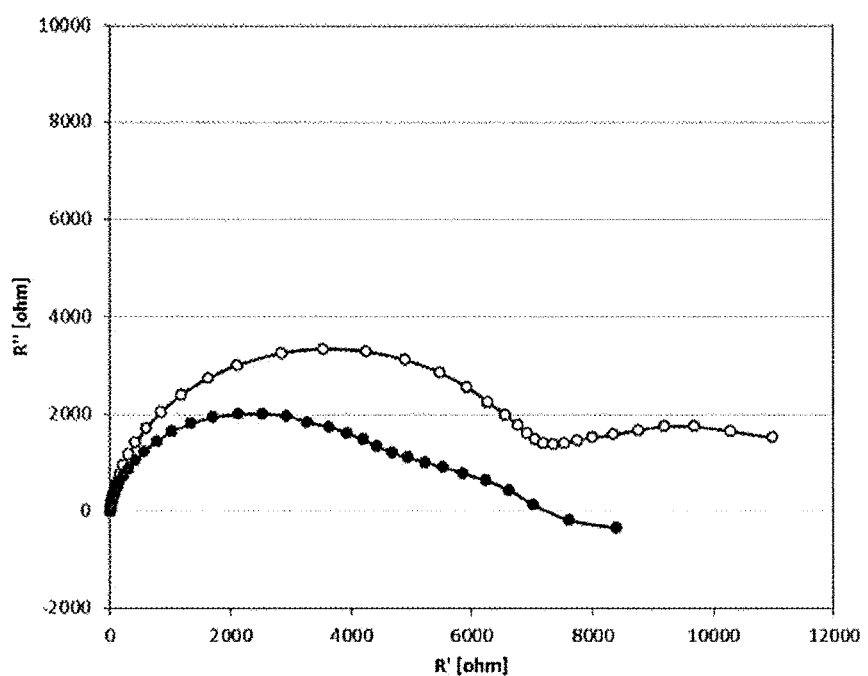
FIG. 2 shows impedance curves for the magnesium battery of Experiment I.
Figure 3:
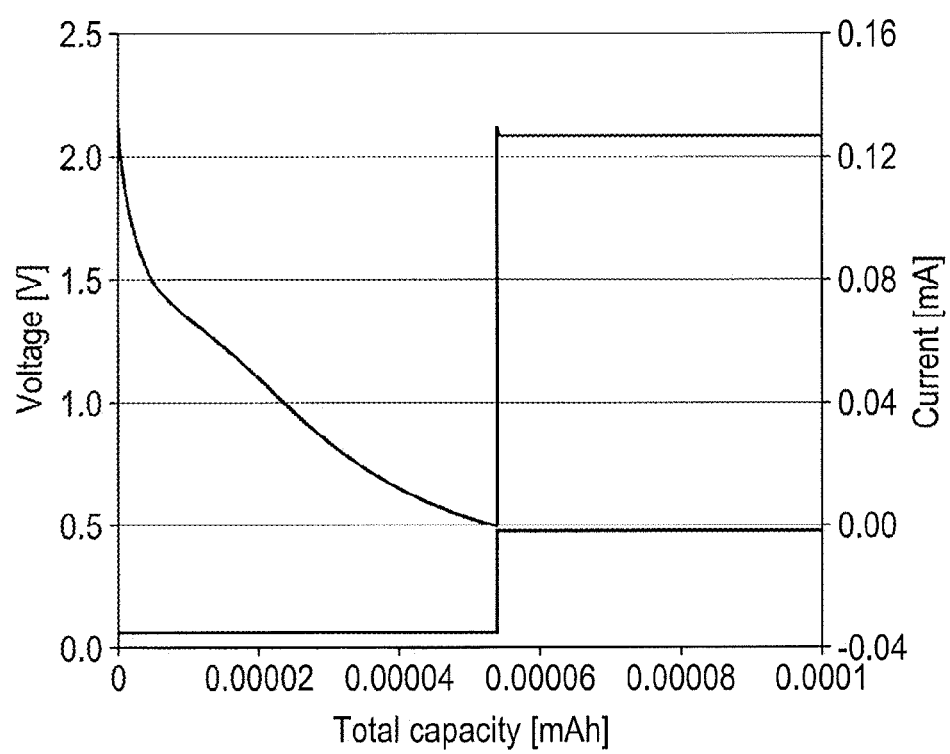
FIG. 3 shows a first discharge curve for the battery of Experiment I.
Figure 4:
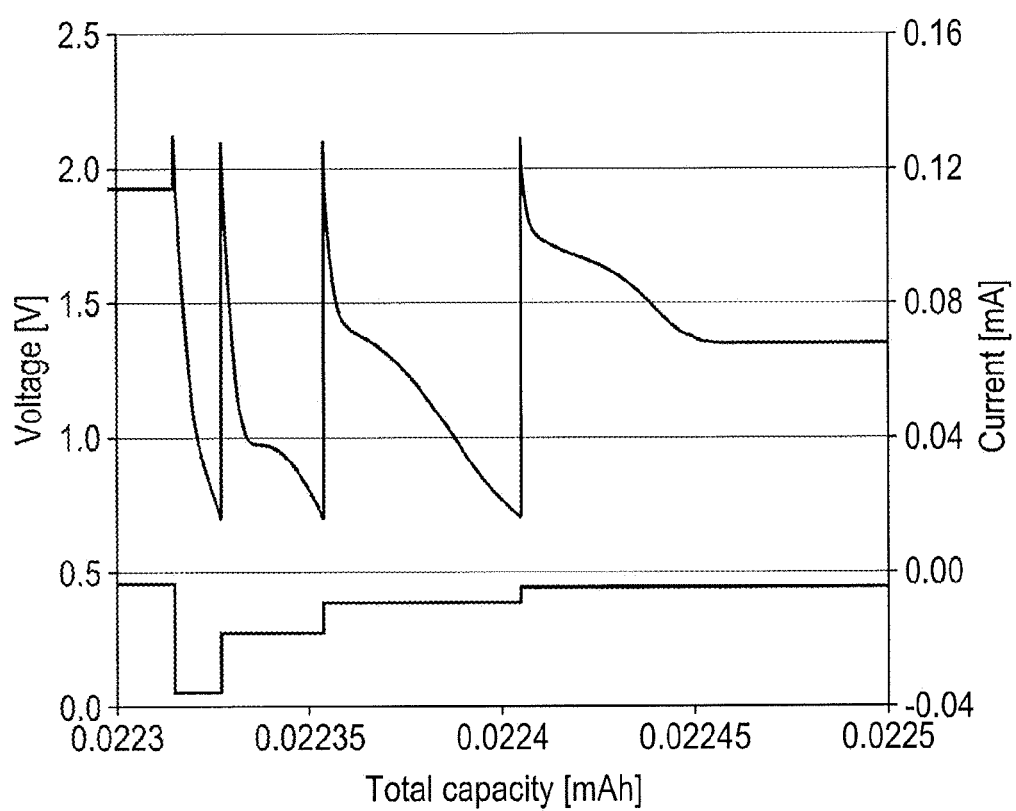
FIG. 4 shows multiple discharge cycles for the battery of Experiment I.

A magnesium-air battery was constructed according to the schematic structure of FIG. 1. The anode was of magnesium metal foil. The electrolyte was 0.75M $Mg(BH_4)_2$ in tetraglyme. The cathode was carbon paper and oxygen was supplied to the cell. FIG. 2 shows the impedance curves for Ar (open circles) and $O_2$ (closed circles). The impedance was too high to discharge the battery at a relatively fast current. FIGS. 3 and 4 show a first discharge cycle and multiple cycles, respectively. A discharge plateau-like curve was observed at around 1.4V. However, the obtained capacity was insufficient.

Experiment II

Figure 5A:
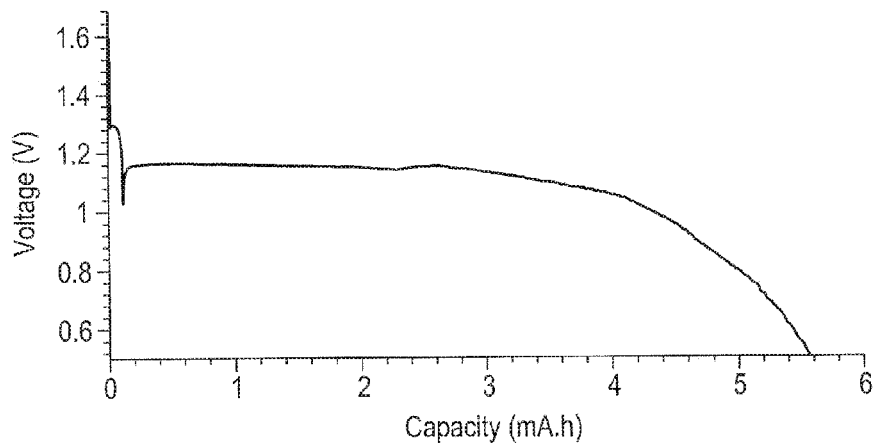
FIG. 5A shows the first discharge curve for the battery of Experiment II.
Figure 5B:
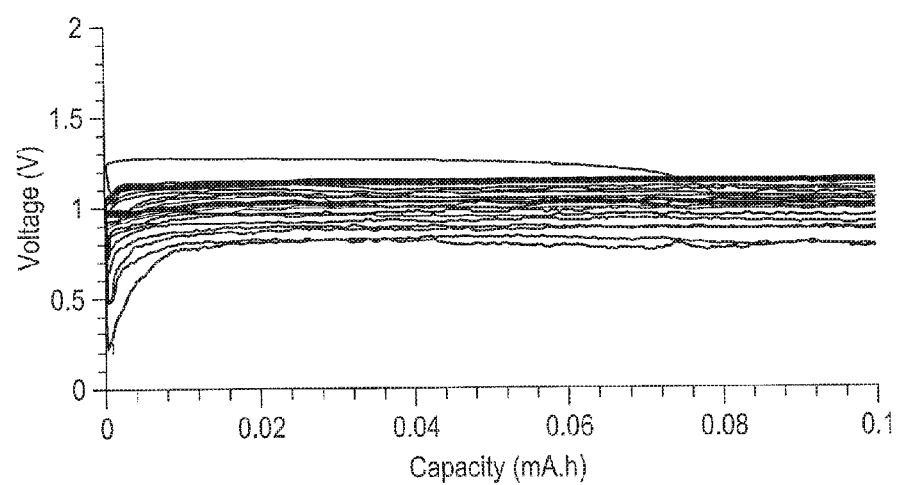
FIG. 5B shows multiple cycles of discharge for the battery of Experiment II.
Figure 6A:
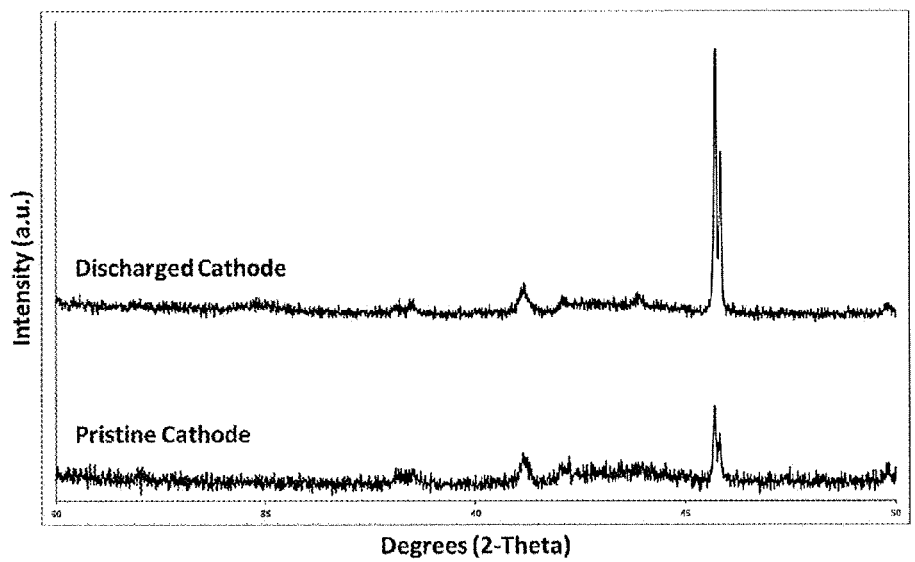
FIG. 6A shows the XRD analysis for the pristine and discharged cathode material of Experiment II.
Figure 6B:
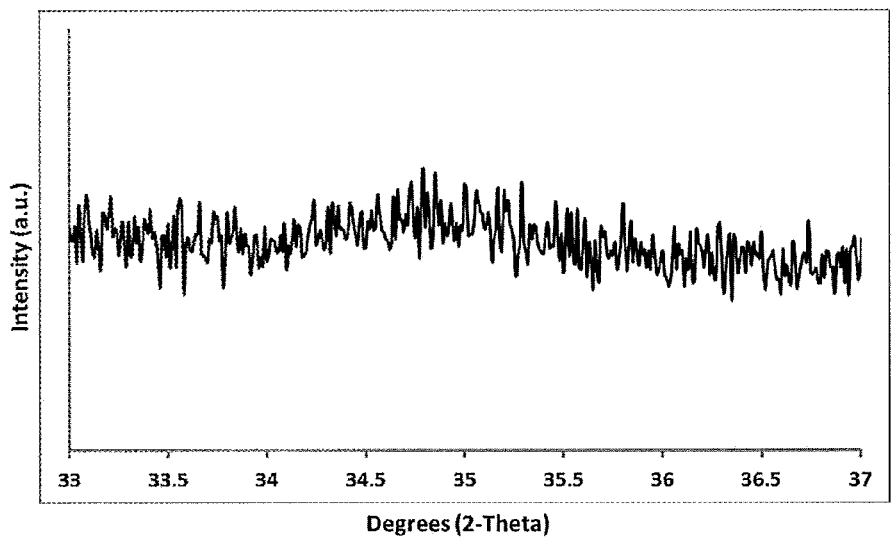
FIG. 6B shows an expanded area of the discharged cathode material from FIG. 6A in a region where a peak from MgO would be expected.
Figure 7:
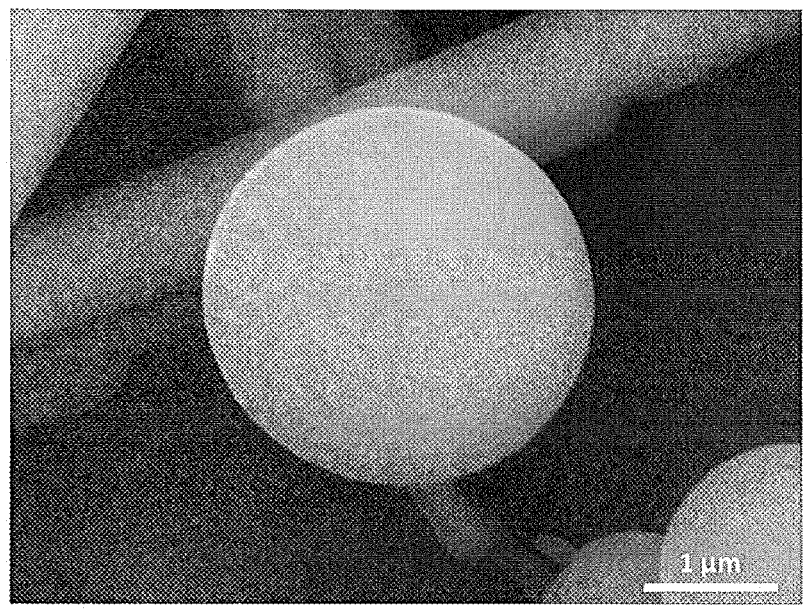
FIG. 7 shows a SEM image of discharged cathode material of Experiment II.
Figure 8:
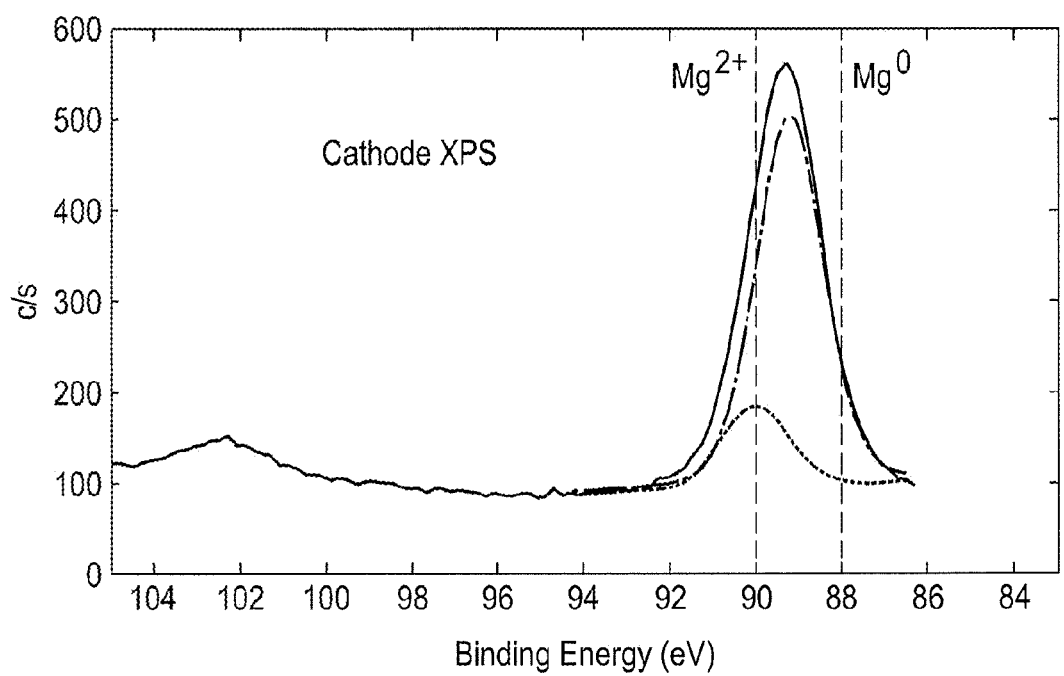
FIG. 8 shows a XPS spectrum of the discharged cathode material of Experiment II.

A magnesium-air battery was constructed according to the schematic structure of FIG. 1. The anode was of magnesium metal foil. The electrolyte was 1:3 $Mg(BH_4)_2$: $LiBH_4$ in dimethoxy ethane (DME). The cathode was carbon paper and oxygen was supplied to the cell. FIGS. 5A and 5B show the first discharge curve and multiple discharge curves, respectively, for the battery. Following discharge the battery was disassembled and the discharge cathode product analyzed by XRD. The XRD spectra for pristine and discharged materials obtained in air-free conditions are shown in FIG. 6A. The expanded portion of FIG. 6A of the discharged material shown in FIG. 6B was believed to show the presence of MgO. A SEM image of the discharged cathode material is shown in FIG. 7. An XPS spectrum of the discharged cathode material is shown in FIG. 8. In FIG. 8 the solid line shows the spectra of the discharged cathode material. The broken line (•- - •) shows the expected (theoretical or data base value) position for Me. The dotted line shows the the expected (theoretical or data base value) position for $Mg^{2+}$.

Experiment III

Figure 9:
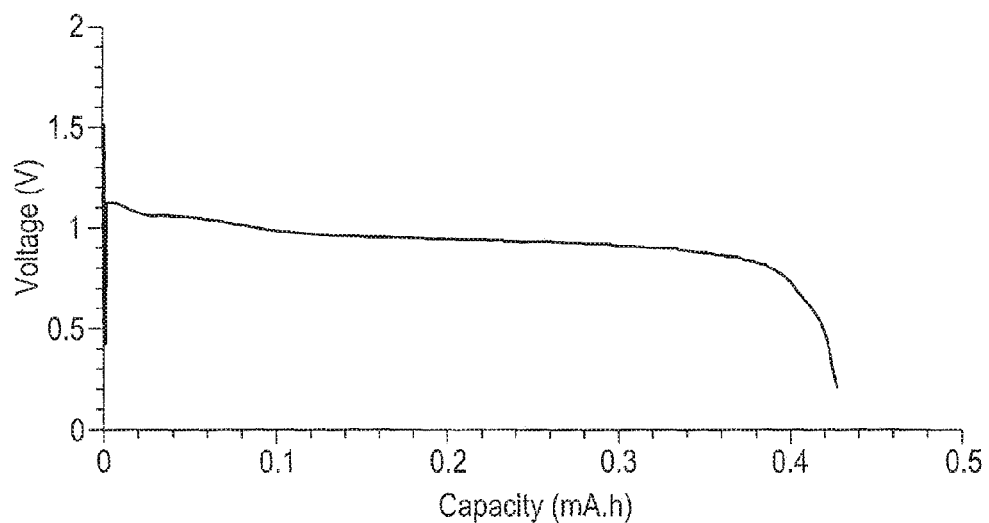
FIG. 9 shows the discharge curve for the battery of Experiment III.

A magnesium-air battery was constructed according to the schematic structure of FIG. 1. The anode was of magnesium metal foil. The electrolyte was 0.17 M $Mg(BH_4)_2$ in polyethylene glycol (PEG). The discharge curve of the battery is shown in FIG. 9.

Experiment IV

Figure 10:
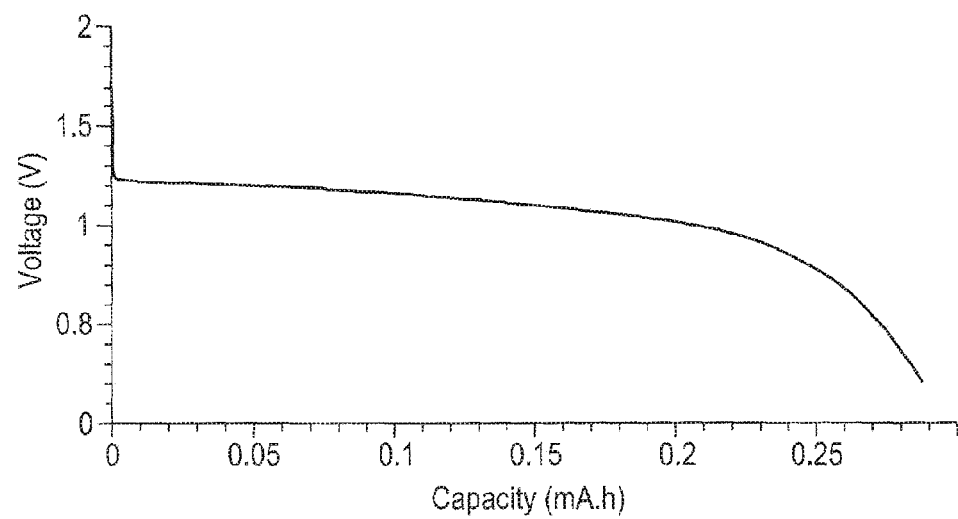
FIG. 10 shows the discharge curve for the battery of Experiment IV.

A magnesium-air battery was constructed according to the schematic structure of FIG. 1. The anode was of $Mg_3Bi_2$ (magnesiated Bi alloy). The electrolyte was 0.5 M $Mg(TFSI)_2$ in DME. The discharge curve of the battery is shown in FIG. 10.

Experiment V

Figure 11:
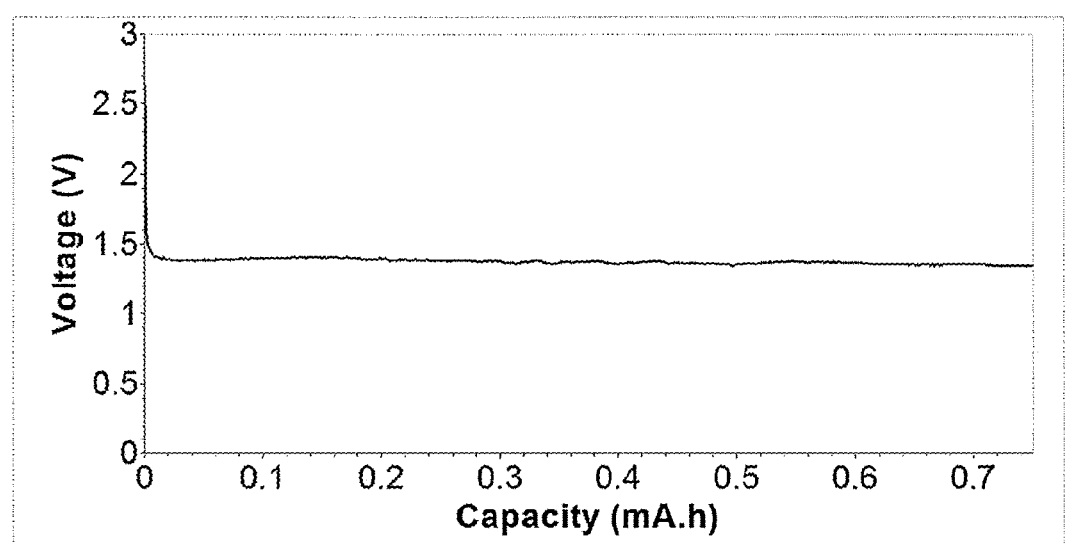
FIG. 11 shows the discharge curve for the battery of Experiment V.

A magnesium-air battery was constructed according to the schematic structure of FIG. 1. The anode was of magnesium metal foil. The electrolyte was 0.375 M $Mg(CB_{11}H_{12})_2$ (MMC) in tetraglyme. The discharge curve of the battery is shown in FIG. 11. The discharge capacity was manually cutoff at 0.75 mA.h. due to a low applied current.

Experiment VI

Figure 12:
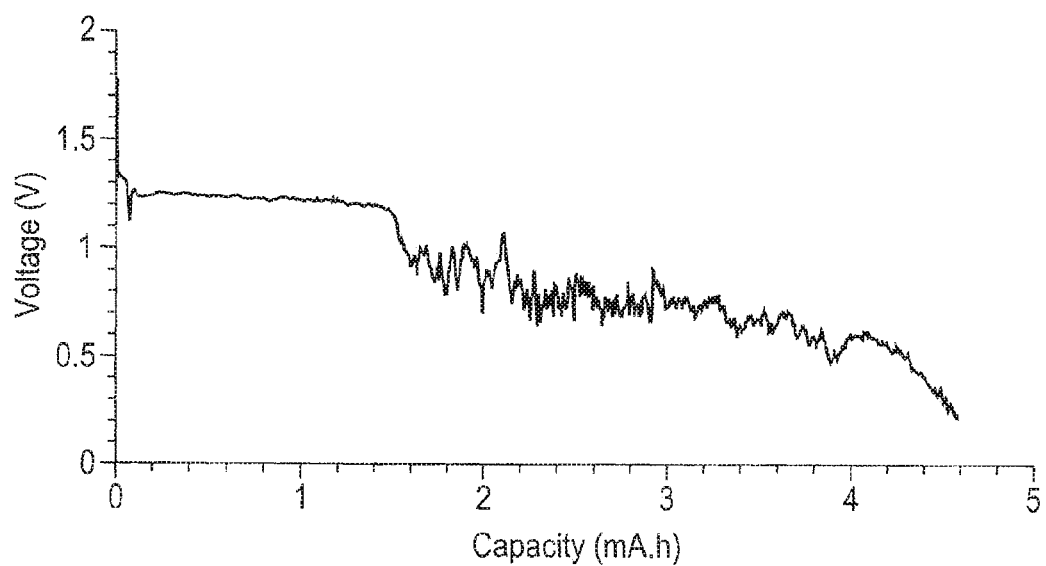
FIG. 12 shows the discharge curve for the battery of Experiment VI.

A magnesium-air battery was constructed according to the schematic structure of FIG. 1. The anode was of AZ31b. The electrolyte was 1:3 $Mg(BH_4)_2$: $LiBH_4$ in DME. The discharge curve of the battery is shown in FIG. 12.

SUMMARY OF ADDITIONAL EXPERIMENTS

In a survey of possible magnesium-air battery structures magnesium-air batteries were constructed according to the structure schematically shown in FIG. 1 and tested for discharge and charge performance. A summary of the systems investigated is shown in Table I.

TABLE 1

| Cathode | Anode | Electrolyte | Gas | Special Notes |
|---|---|---|---|---|
| Carbon Paper | Mg | 1:3 $Mg(BH_4)_2$:$LiBH_4$ in DME | $O_2$ | |
| Carbon Paper | Mg | 1:3 $Mg(BH_4)_2$:$LiBH_4$ in DME | Ar | |
| Carbon Paper | Mg | 0.17M $Mg(BH_4)_2$/DME | $O_2$ | |
| Carbon Paper | Mg | 1:3 $Mg(BH_4)_2$:$LiBH_4$ in DME | $O_2$ | 1.1 V Cutoff |
| Carbon Paper | Mg | 0.5M $Mg(TFSI)_2$ in DME | $O_2$ | |

TABLE 1-continued

| Cathode | Anode | Electrolyte | Gas | Special Notes |
|---|---|---|---|---|
| Carbon Paper | Mg | 0.5M Mg(TFSI)$_2$ in DME | O$_2$ | 60 C. Temp |
| Carbon Paper | Mg | 0.5M Mg(TFSI)$_2$/DEME-TFSI | O$_2$ | |
| Carbon Paper | Mg | 0.5M Mg(TFSI)$_2$/DEME-TFSI | Ar | |
| Carbon Paper | Mg | 0.5M Mg(TFSI)$_2$/DEME-TFSI | O$_2$ | 60 C. Temp |
| Carbon Paper | Mg | 0.5M Mg(TFSI)$_2$/DEME-TFSI | Ar | 60 C. Temp |
| Carbon Paper | AZ31b | 1:3 Mg(BH$_4$)$_2$:LiBH$_4$ in DME | O$_2$ | |
| Carbon Paper | AZ31b | 1:3 Mg(BH$_4$)$_2$:LiBH$_4$ in DME | Ar | |
| Carbon Paper | AZ31b | 1:3 Mg(BH$_4$)$_2$:LiBH$_4$ in DME | O$_2$ | 60 C. Temp |
| Carbon Paper | AZ31b | 1:3 Mg(BH$_4$)$_2$:LiBH$_4$ in DME | Ar | 60 C. Temp |
| Carbon Paper | AZ31b | 0.5M Mg(TFSI)$_2$ in DME | O$_2$ | |
| Carbon Paper | AZ31b | 0.5M Mg(TFSI)$_2$ in DME | Ar | |
| Carbon Paper | AZ31b | 0.5M Mg(TFSI)$_2$/DEME-TFSI | O$_2$ | |
| Carbon Paper | AZ31b | 0.5M Mg(TFSI)$_2$/DEME-TFSI | Ar | |
| Carbon Paper | AZ31b | 0.5M Mg(TFSI)$_2$ in DME | O$_2$ | 60 C. Temp |
| Carbon Paper | AZ31b | 0.5M Mg(TFSI)$_2$ in DME | Ar | 60 C. Temp |
| Carbon Paper | AZ31b | 0.5M Mg(TFSI)$_2$/DEME-TFSI | O$_2$ | 60 C. Temp |
| Carbon Paper | AZ31b | 0.5M Mg(TFSI)$_2$/DEME-TFSI | Ar | 60 C. Temp |
| Carbon Paper | Mg$_3$Bi$_2$ | 0.5M Mg(TFSI)$_2$ in DME | O$_2$ | |
| Carbon Paper | Mg$_3$Bi$_2$ | 0.5M Mg(TFSI)$_2$ in DME | Ar | |
| Carbon Paper | Mg$_3$Bi$_2$ | 0.5M Mg(TFSI)$_2$ in DME | O$_2$ | 60 C. Temp |
| Carbon Paper | Mg$_3$Bi$_2$ | 0.5M Mg(TFSI)$_2$ in DME | Ar | 60 C. Temp |
| MgO | Bi | 1:3 Mg(BH$_4$)$_2$:LiBH$_4$ in DME | O$_2$ | |
| MgO | Bi | 1:3 Mg(BH$_4$)$_2$:LiBH$_4$ in DME | Ar | |
| MgO | Bi | 1:3 Mg(BH$_4$)$_2$:LiBH$_4$ in DME | O$_2$ | 60 C. Temp |
| MgO | Bi | 1:3 Mg(BH$_4$)$_2$:LiBH$_4$ in DME | Ar | 60 C. Temp |
| MgO | Bi | 0.5M Mg(TFSI)$_2$ in DME | O$_2$ | |
| MgO | Bi | 0.5M Mg(TFSI)$_2$ in DME | Ar | |
| MgO | Bi | 0.5M Mg(TFSI)$_2$ in DME | O$_2$ | 60 C. Temp |
| MgO | Bi | 0.5M Mg(TFSI)$_2$ in DME | Ar | 60 C. Temp |
| MgO2 | Bi | 1:3 Mg(BH$_4$)$_2$:LiBH$_4$ in DME | O$_2$ | |
| MgO2 | Bi | 1:3 Mg(BH$_4$)$_2$:LiBH$_4$ in DME | Ar | |
| MgO2 | Bi | 0.5M Mg(TFSI)$_2$ in DME | O$_2$ | |
| MgO2 | Bi | 0.5M Mg(TFSI)$_2$ in DME | Ar | |

AZ 31b is a magnesium alloy containing 3.0 wt % Al. 1.0 wt % Zn and 0.20 wt % Mn.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A magnesium-air battery, comprising:
   an anode compartment comprising an anode comprising magnesium, a magnesium alloy or a material capable of insertion and extraction of magnesium;
   a cathode compartment comprising an air cathode, a source of O$_2$, a magnesium salt comprising at least one of a borohydride anion and a boron cluster anion and a nonaqueous liquid; and
   a membrane or separator between the anode and cathode compartments;
   wherein the nonaqueous liquid comprises an ether of low volatility selected from the group consisting of dimethoxy ethane (monoglyme), diethylene glycol dimethyl ether (diglyme), triethylene glycol dimethyl ether (triglyme) or tetraethylene glycol dimethyl ether (tetraglyme).

2. The magnesium-air battery of claim 1 wherein the nonaqueous liquid further comprises an ionic liquid.

3. The magnesium-air battery of claim 2 wherein the ionic liquid and the ionic liquid is selected from the group consisting of N-methyl-N-propylpiperidinium bis(trifluoromethansulfonyl)imide (PP13TFSI), N,N-diethyl-N-methyl-N-(2-methoxyethyl)ammonium bis(trifluoromethylsulfonyl)imide (DEME-TFSI).

4. The magnesium-air battery of claim 2 wherein the ionic liquid is a magnesium salt of at least one anion selected from the group consisting of bis(trifluoromethansulfonyl)imide anion, bis(fluorosulfonyl)imide anion, tetrafluoroborate anion and hexafluorophosphate anion.

5. The magnesium-air battery of claim 1 wherein the magnesium salt comprises a borohydride anion and the magnesium salt is at least one of Mg(BH$_4$)$_2$, Mg(BH$_4$)$_2$:LiBH$_4$, Mg(C$_2$B$_{10}$H$_{11}$)(BH$_4$) and Mg(CB$_{11}$H$_2$)(BH$_4$).

6. The magnesium-air battery of claim 1, wherein a distance of the cathode from the membrane or separator is from 0 to 20 mm.

7. The magnesium-air battery of claim 1, wherein the membrane or separator separating the anode compartment from the cathode compartment is a polymer, a ceramic or a composite thereof.

8. The magnesium-air battery of claim 2, wherein the cathode compartment further comprises a salt soluble in the ionic liquid which is different from the magnesium electrolyte salt.

9. The magnesium-air battery of claim 8, wherein the ionic liquid soluble salt is selected from the group consisting of a tetraalkyl ammonium salt, an imidazolium salt, a pyridinium salt and a piperidinium salt.

10. The magnesium-air batters of claim 9, wherein the ionic liquid soluble salt is tetrabutyl ammonium bis(trifluoromethylsulfonyl)imide (TBA-TFSI).

11. The magnesium-air battery claim 1, wherein the source of O$_2$ is ambient air.

12. A vehicle comprising the battery of claim 1.

* * * * *